United States Patent
Williams et al.

(10) Patent No.: US 8,726,272 B2
(45) Date of Patent: May 13, 2014

(54) EXTENSIBILITY FOR BUSINESS ACCELERATOR AUTHORING TOOLS

(75) Inventors: Thomas R. Williams, Lone Tree, CO (US); Shawn A. Martine, Denver, CO (US); Timothy Threlkeld, Denver, CO (US); Jason K. Reicheneker, Highlands Ranch, CO (US); Daniel Scott Stern, Denver, CO (US); Manuel Albert Neyra, Highlands Ranch, CO (US)

(73) Assignee: Oracle International Corporation, Redwood Shores, CA (US)

( * ) Notice: Subject to any disclaimer, the term of this patent is extended or adjusted under 35 U.S.C. 154(b) by 986 days.

(21) Appl. No.: 12/354,057

(22) Filed: Jan. 15, 2009

(65) Prior Publication Data

US 2010/0180270 A1    Jul. 15, 2010

(51) Int. Cl.
   *G06F 9/445*    (2006.01)

(52) U.S. Cl.
   USPC .......................................... 717/178; 717/173

(58) Field of Classification Search
   USPC .................................................. 717/173, 178
   See application file for complete search history.

(56) References Cited

U.S. PATENT DOCUMENTS

| | | | |
|---|---|---|---|
| 6,256,773 B1 | 7/2001 | Bowman-Amuah | |
| 6,606,744 B1 | 8/2003 | Mikurak | |
| 6,741,997 B1 * | 5/2004 | Liu et al. | 1/1 |
| 6,836,657 B2 * | 12/2004 | Ji et al. | 455/419 |
| 7,191,435 B2 * | 3/2007 | Lau et al. | 717/168 |
| 7,206,828 B1 * | 4/2007 | Bourke-Dunphy et al. | 709/221 |
| 7,346,627 B2 | 3/2008 | Ramanathan et al. | |
| 7,836,458 B1 * | 11/2010 | Gwozdz et al. | 719/320 |
| 7,865,707 B2 | 1/2011 | Bittlingmayer et al. | |
| 7,873,684 B2 | 1/2011 | Souder et al. | |
| 8,464,244 B2 | 6/2013 | Stern et al. | |
| 2004/0128644 A1 | 7/2004 | Hurst et al. | |
| 2005/0010919 A1 * | 1/2005 | Ramanathan et al. | 717/174 |
| 2005/0038831 A1 * | 2/2005 | Souder et al. | 707/201 |
| 2005/0055351 A1 | 3/2005 | Barton et al. | |
| 2005/0068558 A1 * | 3/2005 | Wang et al. | 358/1.13 |
| 2005/0138558 A1 | 6/2005 | Duevel et al. | |

(Continued)

OTHER PUBLICATIONS

Oracle9i Database Migration Chapter 5 Compatibility and Interoperability, Oracle (Published 2002) retrieved from http://docs.oracle.com/cd/B10501_01/server.920/a96530/migcompa.htm on Mar. 29, 2013.*

(Continued)

*Primary Examiner* — Don Wong
*Assistant Examiner* — Theodore Hebert
(74) *Attorney, Agent, or Firm* — Kilpatrick Townsend & Stockton LLP (57) ABSTRACT

Embodiments of the present invention provide for updating an application such as an authoring tool for defining one or more customized configurations of a software package. According to one embodiment, a base package including the application and information defining a base configuration for the application can be received and installed. Instructions to create a custom configuration of the application can be received and information defining the custom configuration can be saved separate from the application and the base configuration. An update package including an update to the authoring tool can be received and installed. The information defining the custom configuration can be read and compared to the update to the authoring tool to determine whether the update affects the custom configuration. If the update to the authoring tool affects the custom configuration, elements of the custom configuration that are found to be affected can be reported.

23 Claims, 6 Drawing Sheets

(56) References Cited

U.S. PATENT DOCUMENTS

| | | | |
|---|---|---|---|
| 2005/0188367 A1* | 8/2005 | Oberholtzer | 717/168 |
| 2006/0015839 A1* | 1/2006 | Owens et al. | 717/100 |
| 2007/0061803 A1* | 3/2007 | Barrett | 717/178 |
| 2007/0157170 A1* | 7/2007 | Reiss et al. | 717/121 |
| 2007/0220248 A1* | 9/2007 | Bittlingmayer et al. | 713/100 |
| 2007/0240152 A1* | 10/2007 | Li et al. | 717/174 |
| 2007/0256056 A1* | 11/2007 | Stern et al. | 717/121 |
| 2008/0209413 A1* | 8/2008 | Kakumani et al. | 717/172 |
| 2008/0243589 A1* | 10/2008 | Lim et al. | 705/10 |
| 2008/0271008 A1* | 10/2008 | Dettori et al. | 717/168 |
| 2009/0083728 A1* | 3/2009 | Dennis et al. | 717/174 |
| 2009/0178034 A1 | 7/2009 | Stern et al. | |

OTHER PUBLICATIONS

Gupta, M., "Oracle iSetup User Guide," Release 11i.9, part No. B10695-01, Jun. 2003, Oracle Corporation, 500 Oracle Parkway, Redwood Shores, CA, 156 pages.

Serbedzija, N., et al., "E-Quest: A Simple Solution for E-Questionnaires," IADIS International Conference e-Society, 2004, pp. 452-432.

U.S. Appl. No. 11/380,254, filed Apr. 26, 2006, Office Action dated Oct. 12, 2011, 24 pages.

U.S. Appl. No. 11/970,833, filed Jan. 8, 2008, Office Action dated Sep. 19, 2011, 9 pages.

U.S. Appl. No. 11/380,254, filed Apr. 26, 2006, Final Office Action dated Jul. 2, 2010, 21 pages.

Author Unknown, "Exporting and Importing Content," Oracle Corporation, 2004, 52 pages.

Lubbers, P., "Oracle9iAS Portal Configuration Guide, Release 2 (9.0.2)," Oracle Corporation, 2002, 188 pages.

Serbedzija, N., et al., "E-Quest: A Simple Solution for E-Questionnaires," IADIS International Conference e-Society, 2004, pp. 425-432.

U.S. Appl. No. 11/380,254, filed Apr. 26, 2006, Advisory Action dated Sep. 13, 2010, 3 pages.

U.S. Appl. No. 11/380,254, filed Apr. 26, 2006, Final Office Action dated Apr. 11, 2012, 29 pages.

U.S. Appl. No. 11/970,833, filed Jan. 8, 2008, Final Office Action dated Mar. 1, 2012, 9 pages.

U.S. Appl. No. 11/380,254, filed Apr. 26, 2006, by Daniel Scott Stern et al., Advisory Action dated Jun. 28, 2012, 4 pages.

About Oracle iSetup Mini-Pack 11i.AZ.F, Jul. 20, 2006, ile:// C:\Documents and Settings\sbm\Local Settings\Temp\About Oracle iSetup Mini-pac . . . , 8 pages.

Gupta, Manoj, "Oracle iSetup User Guide," Release 11i, part No. B10695-02, Sep. 2004, Oracle Corporation, 500 Oracle Parkway, Redwood Shores, CA, 137 pages.

Oracle iSetup 11i Data Sheet, iSetup Migrator Key Features and iSetup Reporter Key Features, Sep. 2004, Oracle Corporation, 500 Oracle Parkway, Redwood Shores, CA, 3 pages.

U.S. Appl. No. 11/380,254, filed Apr. 26, 2006, Office Action dated Jan. 20, 2010, 21 pages.

What is Oracle iSetup?, Key Product Benefits, Jul. 20, 2006, file:// C:\Documents and Settings\sbm\LocalSettings\Temp\Apps Migrator.htm, 2 pages.

U.S. Appl. No. 11/380,254, Office Action Response, mailed Jun. 11, 2012 12 pages.

U.S. Appl. No. 11/970,833, Notice of Allowance, mailed Feb. 14, 2013, 7 pages.

* cited by examiner

EXTENSIBILITY FOR BUSINESS ACCELERATOR AUTHORING TOOLS

RELATED APPLICATIONS

This application is related to U.S. patent application Ser. No. 11/380,254 filed Apr. 26, 2006 by Stem et al and entitled "Tools for Automated Extraction and Loading of Configuration Settings" and U.S. patent application Ser. No. 11/970,8332 filed Jan. 8, 2008 by Stem et al and entitled "Implementation Tool Combining Pre-Configuration and Questionnaire" of which the entire disclosure of each is incorporated herein by reference for all purposes.

BACKGROUND OF THE INVENTION

Embodiments of the present invention relate generally to updating an application and more particularly to updating an application such as an authoring tool for defining one or more customized configurations of an enterprise solution or other software package.

When installing an application, any number of different settings can be configured for a variety of different aspect of the application. For example, most users of different types of applications are familiar with user preference type settings for controlling the look and feel of an application as well as other aspects of how the application behaves. Of course, any number of other types of settings are configurable as known in the art. As the size of the application grows, the number of configurable features or aspects of the application can grow as well. Thus, for a large application, application suite, or enterprise solution, the number of settings that may be configured or set at installation time can be overwhelming or, at the least, difficult and time consuming to deal with.

In some cases, such applications may be pre-configured by the software vendor or other party providing the software or services related thereto. For example, an application suite may be provided to a user with some or all of the possible configurations pre-set. In some cases, the application may be pre-configured for a particular market, use or application, region, etc. After installation, the user can adjust or modify these configurations. Additionally or alternatively, large applications can be configured via an interactive process such as a wizard or other set-up routine. These routines, run at installation or upon request, present an interactive dialog to query the user as to the configuration desired which is then set via the routine. Again, the user can adjust or modify these configurations, perhaps by re-executing the set-up routine or by manually changing configuration settings.

In order to provide these customizations, either in the form of a set of pre-configured software settings, as part of a standard or customized wizard or questionnaire, or both, an authoring tool can be used by a software vendor of other party providing the software or services related thereto. Such a tool can provide an environment in which a developer can manipulate and save a configuration and/or wizard or questionnaire questions, tasks, etc. for distribution to customers to use during installation and/or setup of the related application.

While such tools provide a convenient, quick way for developers to produce custom configurations for an application, they have limitations that discourage developers from utilizing the full abilities of the authoring tool to develop detailed customized configurations. Namely, when the authoring tool changes, i.e., via an update, patch, etc., a vendor or other entity using the authoring tool needs to reset retest etc all customizations. Such changes, testing, etc. are time consuming, tedious, and costly. Thus, developers are reluctant to use these authoring tools to develop custom configurations that are extensive and/or detailed. Rather, developers tend to limit the scope of any customizations in order to avoid the time and expense associated with such restoration and retesting when the authoring tool is changed. Hence, there is a need in the art for improved systems and methods for updating an application such as a business accelerator authoring tool having one or more defined customized configurations.

BRIEF SUMMARY OF THE INVENTION

Systems, methods, and machine-readable media are disclosed for updating an application such as a business accelerator authoring tool for defining one or more customized configurations for another application such as an enterprise solution or other software package. According to one embodiment, a method for updating an authoring tool for providing one or more customized configurations for an application can comprise receiving a base package including the application and information defining a base configuration for the application. The application and the base configuration for the application can be installed. Instructions to modify the base configuration for the application to create a custom configuration for the application can be received via the authoring tool. Information defining the custom configuration for the application can be saved separate from the application and the information defining the base configuration for the application.

In one implementation, the information defining the base configuration for the application can include a pre-defined schedule and a pre-defined data model. The pre-defined schedule can define tasks for installing and configuring the application. The data model can include pre-defined configuration settings. In some cases, the data model can further include information defining a questionnaire for configuring the application. The instructions to modify the base configuration for the application can include instructions to modify the schedule and/or instructions to modify the data model.

An update package can be received. The update package can include an update to the authoring tool and/or an update to the base configuration for the application. The update to the authoring tool can be installed and/or the update to the base configuration for the application can be installed. The update to the base configuration for the application, if any, can comprise an update to the schedule of the base configuration for the application and/or an update to the data model of the base configuration for the application. The information defining the custom configuration for the application can be read and compared to the update to the authoring tool. A determination can be made as to whether the update to the authoring tool affects the custom configuration for the application based on comparing the information defining the custom configuration for the application to the update to the authoring tool. In response to determining the update to the authoring tool affects the custom configuration for the application, elements of the custom configuration for the application that are found to be affected can be reported.

According to another embodiment, a system can comprise a processor and a memory communicatively coupled with and readable by the processor. The memory can have stored therein a series of instructions which, when executed by the processor, cause the processor to receiving a base package including the application and information defining a base configuration for the application. The application and the base configuration for the application can be installed. Instructions to modify the base configuration for the application to create a custom configuration for the application can be received via an authoring tool. Information defining the custom configuration for the application can be saved separate from the application and the information defining the base configuration for the application. Information defining the base configuration for the application can include a pre-defined schedule and a pre-defined data model. The instructions to modify the base configuration for the application include instructions to modify the schedule, instructions to modify the data model, or both.

An update package can be received. The update package can include an update to the authoring tool and/or an update to the base configuration for the application. The update to the authoring tool and/or the update to the base configuration for the application can be installed. The update to the base configuration for the application, if any, can comprise an update to the schedule of the base configuration for the application and/or an update to the data model of the base configuration for the application. The information defining the custom configuration for the application can be read and compared to the update to the authoring tool. A determination can be made as to whether the update to the authoring tool affects the custom configuration for the application based on comparing the information defining the custom configuration for the application to the update to the authoring tool. In response to determining the update to the authoring tool affects the custom configuration for the application, elements of the custom configuration for the application that are found to be affected can be reported.

According to yet another embodiment, a machine-readable medium can have stored thereon a series of instructions which, when executed by a processor, cause the processor to update an authoring tool for an application having one or more customized configurations by receiving a base package including the application and information defining a base configuration for the application, installing the application and the base configuration for the application, receiving via the authoring tool instructions to modify the base configuration for the application to create a custom configuration for the application, and saving information defining the custom configuration for the application separate from the application and the information defining the base configuration for the application. The information defining the base configuration for the application can include a pre-defined schedule and a pre-defined data model. An update package can be received that includes an update to the authoring tool. The update to the authoring tool can be installed. The information defining the custom configuration for the application can be read and compared to the update to the authoring tool. A determination can be made as to whether the update to the authoring tool affects the custom configuration for the application based on comparing the information defining the custom configuration for the application to the update to the authoring tool. In response to determining the update to the authoring tool affects the custom configuration for the application, elements of the custom configuration for the application that are found to be affected can be reported.

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination corresponds to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Importantly, it should be noted that embodiments of the present invention may be implemented in a wide variety of environments and on a wide variety of devices and/or systems. Therefore, the following exemplary environments and systems are offered for illustrative purposes only and should not be considered limiting on the wide variety of possible implementation of the various embodiments of the present invention.

Generally speaking, embodiments of the present invention provide methods and systems for updating an application such as an authoring tool for defining one or more customized configurations of an enterprise solution or other software package. According to one embodiment, updating an authoring tool for providing one or more customized configurations for an application can comprise receiving a base package including the application and information defining a base configuration for the application, installing the application and the base configuration for the application, receiving via the authoring tool instructions to modify the base configuration for the application to create a custom configuration for the application, and saving information defining the custom configuration for the application separate from the application and the information defining the base configuration for the application. The information defining the base configuration for the application can include a pre-defined schedule and a pre-defined data model. An update package can be received that includes an update to the authoring tool. The update to the authoring tool can be installed. The information defining the custom configuration for the application can be read and compared to the update to the authoring tool. A determination can be made as to whether the update to the authoring tool affects the custom configuration for the application based on comparing the information defining the custom configuration for the application to the update to the authoring tool. In response to determining the update to the authoring tool affects the custom configuration for the application, elements of the custom configuration for the application that are found to be affected can be reported. Additional details of various embodiments of the present invention will be described below with reference to the figures.

Figure 1:
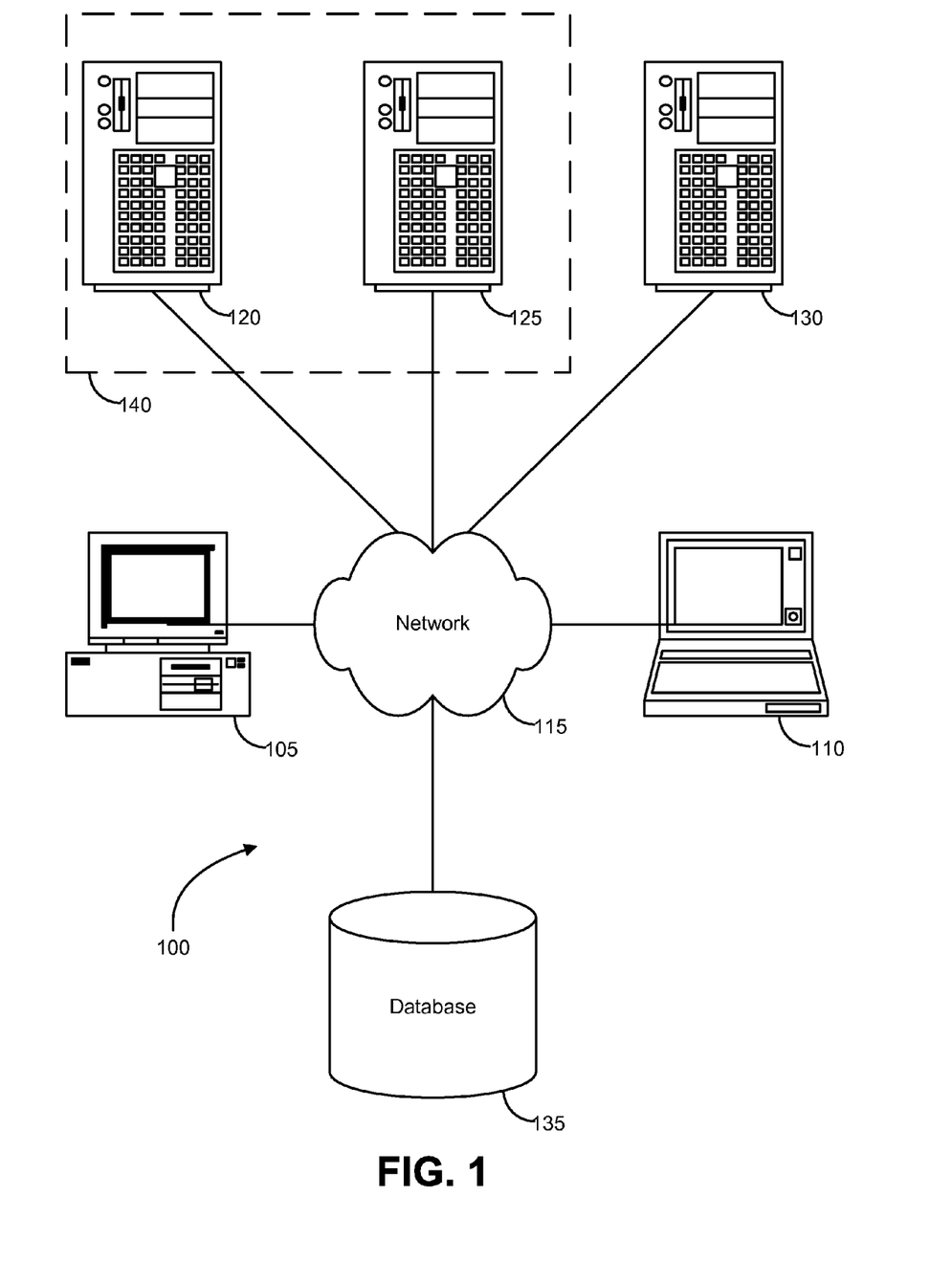
FIG. 1 is a block diagram illustrating components of an exemplary operating environment in which various embodiments of the present invention may be implemented.

FIG. 1 is a block diagram illustrating components of an exemplary operating environment in which various embodiments of the present invention may be implemented. The system 100 can include one or more user computers 105, 110, which may be used to operate a client, whether a dedicated application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle, Microsoft, Sybase™, IBM™ and the like, which can process requests from database clients running on a user computer 105, 110.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers

105, 110, 115, 125, 130 may be stored locally on the respective computer and/or remotely, as appropriate. In one set of embodiments, the database 135 may be a relational database, such as Oracle 10 g, that is adapted to store, update, and retrieve data in response to SQL-formatted commands.

Figure 2:
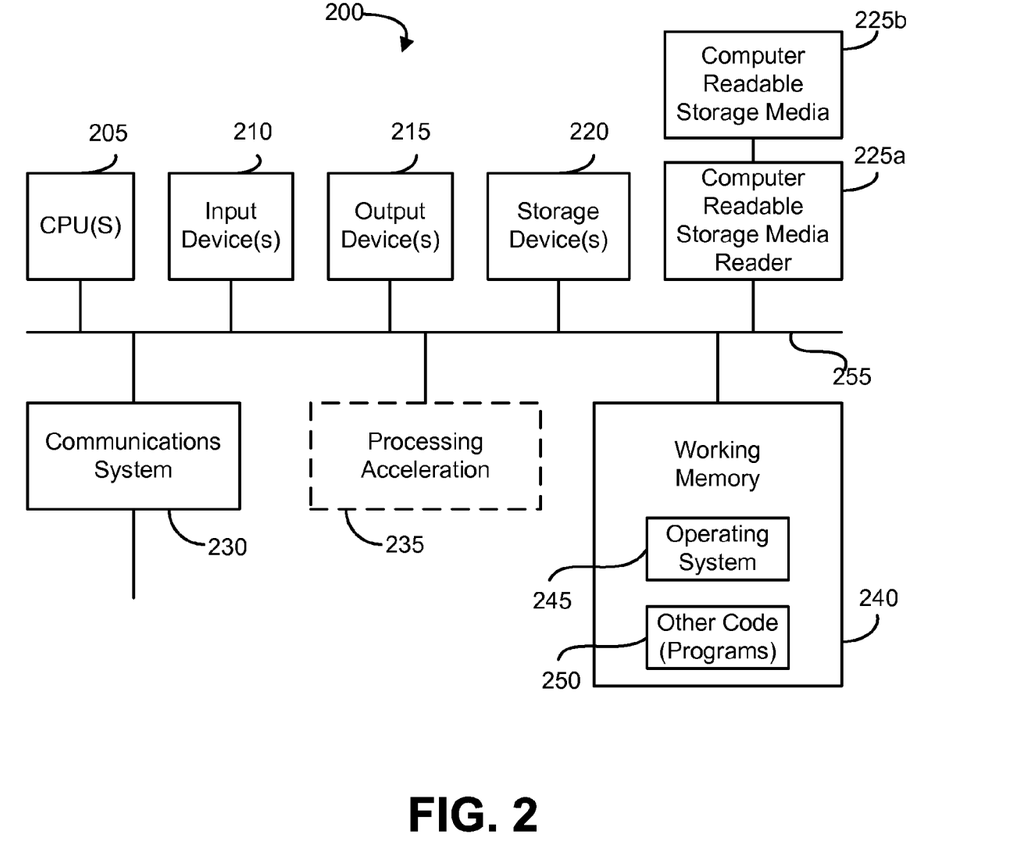
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing the methods and systems described herein.

As noted above, embodiments of the present invention provide methods and systems for updating an application such as an authoring tool for defining one or more customized configurations of an enterprise solution or other software package. According to one embodiment, a base package including the application and information defining a base configuration for the application can be received and installed. Instructions to modify the base configuration for the application to create a custom configuration can be received and information defining the custom configuration can be saved separate from the application and the information defining the base configuration for the application. An update package including an update to the authoring tool can be received and installed. The information defining the custom configuration can be read and compared to the update to the authoring tool. A determination can be made as to whether the update to the authoring tool affects the custom configuration for the application based on the comparison. If the update to the authoring tool affects the custom configuration, elements of the custom configuration that are found to be affected can be reported.

The base package can be generated in any of a number of different ways as known in the art. Additionally, the based configuration, which can include pre-set configuration information, a questionnaire, or both, can be generated in any of a number of different ways. A package including the application and base configuration can be generated and distributed as described in the Related Applications referenced above and incorporated herein. For example, a base application and configuration information for the application, possibly including a set of pre-set configuration information and/or a questionnaire, can be generated and distributed according to the methods and systems described in the Related Application entitled "Implementation Tool Combining Pre-Configuration and Questionnaire" a portion of which is summarized here by way of example. However, it should be understood that such systems and methods are not required. Rather, other systems and methods for generating and distributing a base application and/or a configuration for that application are contemplated and considered to be within the scope of the present invention.

Figure 3:
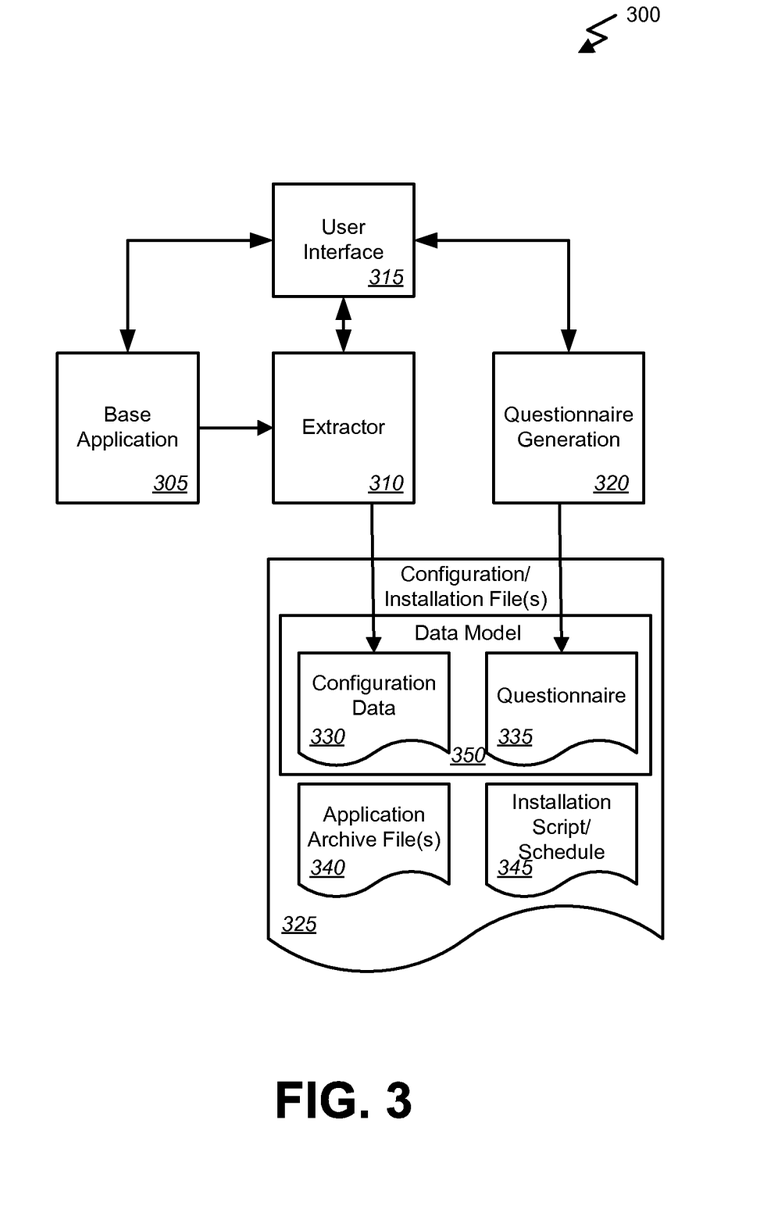
FIG. 3 is a block diagram illustrating elements of an exemplary system for providing an application and a base configuration for the application which may be utilized with embodiments of the present invention.

FIG. 3 is a block diagram illustrating elements of an exemplary system for providing an application and a base configuration for the application which may be utilized with embodiments of the present invention. This system 300 represents one possible example of a system that can be employed by a software vendor, service provider, or other party to provide customized configuration information for an application. As noted above, the embodiments described herein can be used, for example, to provide for configuration of a new installation of an application. In other implementations, embodiments can be used to configure an already installed (i.e., configured, working, in use) executable application. For example, a customer may want to start using a new feature or module of the executable application, or a related application in a suite of applications, etc. In such cases, they can use an implementation of the configuration tool described herein to configure that new part. As will be seen, other implementations are possible and not all of the elements illustrated here are required in other implementations.

In this example, the system includes a base version of the application 305, a user interface 315, an extractor 310, and questionnaire generation module 320. The base version of the application 305 can comprise, for example, a version of the application that has been pre-configured for a particular user, group of users, market, region, industry, etc. Generally speaking, the system 300 can be adapted to save a set of configuration information 330 related to the application. For example, the base version of the application 305 can be configured and the set of configuration information 330 can be extracted from the base version of the application 305 by the extraction module 310. According to one embodiment, the extraction module 310 can be implemented according to the methods and systems described in the Related Application entitled "Tool for Automated Extraction and Loading of Configuration Settings" referenced above and incorporated herein. Alternatively or additionally, configuration information 330 for the application can be set and saved in other ways. For example, configuration information 330 can be entered manually via the user interface 315, copied from a set of other, preset data (not shown here), via some combination of these methods or in another manner.

The questionnaire generation module 320 can be adapted to generate and save a questionnaire 335 related to the configuration of the application. That is, via the questionnaire generation module 320 a set of one or more questions related to configuration of the application can be defined and saved in a questionnaire 335. In some cases, the questions may relate to some or all of the configuration information 330 extracted and/or saved. That is, at least one of the set of one or more questions of the questionnaire 335 can relate to at least a subset of the set of configuration information 330. In other cases, the questions of the questionnaire 325 can be related or directed to configuration settings of the application other than those extracted and/or saved. Additional details of exemplary contents of the questionnaire 335 are described in the Related Applications.

Generally speaking, defining the set of one or more questions of the questionnaire 320 can comprise identifying the one or more questions and defining the questions, for example according to a predetermined data model. That is, there can be a data model 350 defined with the questions that allows the 'answers' to be both pre-seeded and saved when they are manipulated by the user. The data model 350 can also include and/or associate the questionnaire with the extracted configuration data 330. Identifying and defining the questions can be performed by the questionnaire generation module 320 based on direction or input from the user via the user interface 315. That is, a user can enter a question, identify configurations settings of the application and/or saved configuration information 330 to which the question relates and, as will be seen, instructions for loading or updating the configuration settings of an installed executable version of the application based on answers to those questions. The exact format of the user interface 315 can vary based on the exact implementation of the system 300 without departing from the scope of the present invention.

It should be noted that, the set of extracted and/or saved configuration information 330 can comprise configuration information for a plurality of different configurations of the application. In such a case, the set of questions stored in the questionnaire 335 can comprise one or more questions directed to selecting one of the plurality of different configurations of the application. The set of questions can also comprise at least one subset of questions related to the selected configuration. That is, the base application 305 (if any) can comprise multiple versions or configurations. From or based on these configurations, multiple sets of configuration data 330 can be extracted and/or saved. Multiple sets of questions corresponding to or supplementing these multiple sets of configuration information can also be defined and saved in the questionnaire 335. One or more of the questions can also be defined for selecting between these multiple configurations. As will be seen, based on an answer to such configuration selection question(s), the corresponding set of configuration information and questions can be used to update or configure an installed executable version of the application. Additional details of an exemplary process for generating and delivering configuration information for an application will be described below with reference to FIG. 6.

The set of configuration information 330 and the questionnaire 335 can be delivered for use in configuring an installation of the application. That is, the software vendor, service provider, or other party providing configuration information for the application can save the configuration information 330 and questionnaire 335 as part of one or more configuration or installation files 325 that can be distributed to a user or client system. An executable version of the application on the client or other system can be configured based on the set of configuration information and answers to the set of one or more questions. Details of an exemplary system for configuring an executable version of an application based on the pre-set configuration information 330 and the questionnaire 335 are described in the Related Applications. Details of an exemplary method for configuring an executable version of an application based on the pre-set configuration information 330 and the questionnaire 335 are also described in the Related Applications.

The configuration information 330 and questionnaire 335 can be provided as part of or saved in the set of one or more configuration or installation files 325. In cases where the configuration information 330 and questionnaire 335 are provided as part of distribution of the application itself, the configuration or installation files 325 can also include one or more application archive files 340 and/or an installation script 345 or schedule for installing the application from the application archive files 340. However, it should be noted that embodiments of the present invention are not limited to use in situations where an application is being distributed along with the configuration information. That is, it is not required that the configuration information 330 and questionnaire 335 be generated or distributed with application archive files 340 or installation script 345. Rather, configuration information 330 and questionnaires 335 can be generated and distributed separate from or independent of the rest of a software package. For example, configuration information 330 and questionnaires 335 can be generated and distributed as part of an update to previously installed applications. In another example, configuration information 330 and questionnaires 335 can be generated prior to installation of the application, such as during a sales or consulting meeting, and later used upon installation or after installation of the application to configure the application based on the information obtained during the meeting. Other implementations are also contemplated and considered to be within the scope of the present invention.

Regardless of exactly how or where an application and/or configuration information for that application are generated and distributed, the application and/or configuration information can be distributed to a system that may be used for further development. For example, the application and/or configuration information may be provided by a software vendor to another vendor, service provider, or other entity. This entity may be, for example, a business partner with the original software vendor and may serve a particular market, either geographically, by a particular product or service, etc. As noted above, such a vendor or other entity can use an authoring tool that allows that entity to set, modify, and save customized configurations. These customized configurations can be based on a modification of the base configuration or may be newly developed configurations.

Figure 4:
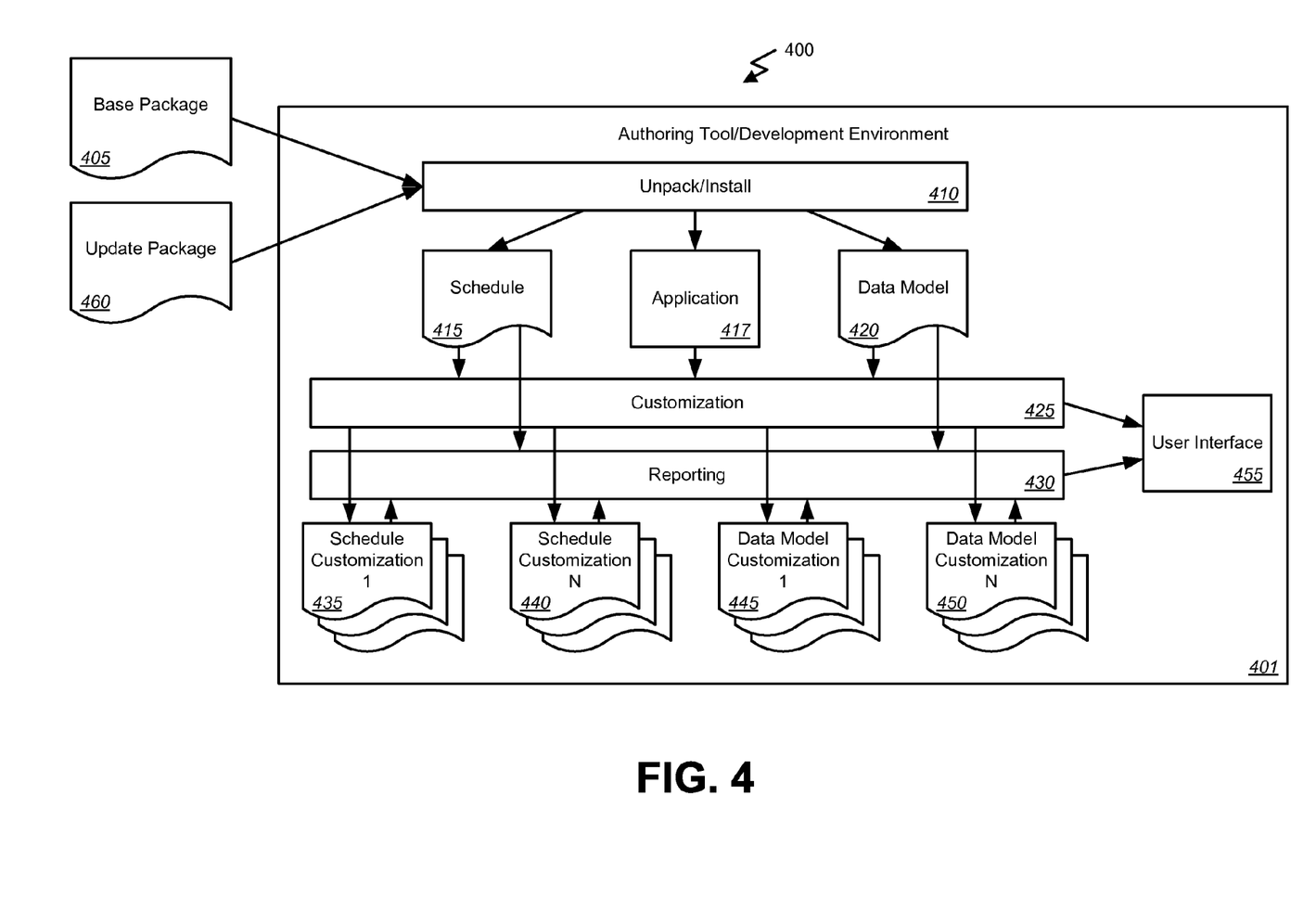
FIG. 4 is a block diagram illustrating elements of a system for updating an authoring tool according to one embodiment of the present invention.

FIG. 4 is a block diagram illustrating elements of a system for updating an authoring tool according to one embodiment of the present invention. In this example, the system 400 includes an authoring tool environment 401, i.e., an environment created and maintained by the authoring tool during execution. The authoring tool environment 401 can receive a base package 405 such as the configuration/installation files 325 described above. As noted, these files can include, for example, a base version of an application and possibly configuration information as described above, e.g., a schedule, a data model, etc. Via an installation module 410, the authoring tool environment 401 can unpack and install the application

417 and base configuration including the schedule 415 and data model 420 from the base package 405.

The authoring tool environment can also include a customization module 425 to allow a user, via user interface 455 to view, edit, and save configuration setting, questions, etc of the base configuration. According to one embodiment, the customization module can comprise an extractor and/or questionnaire generation module as described above. Thus, via the user interface 455 and customization module 425, a user can view and edit the schedule 415 and data model 420 to create one or more schedule customizations 435 and 440 and/or one or more data model customizations 445 and 450. Further, each of the one or more schedule customizations 435 and 440 and/or one or more data model customizations 445 can include one or more sub-customizations, i.e., variations one the schedule customization 435 or 440 or data model customization 445 or 450. The one or more schedule customizations 435 and 440 and/or one or more data model customizations 445 can be saved by the authoring tool environment separate from the original application 417, schedule 415, and data model 420.

At some point in time, the authoring tool may be updated or modified. In such a case, the installation module 410 of the authoring tool environment 401 can receive an update package 460. The update package can include an update tot the authoring tool. Additionally or alternatively, the update package may include an update to the schedule 415 and/or the data model of the base configuration. The installation module 410 can install or update the authoring tool and any updates to the schedule 415 and/or data model 420 of the base configuration.

In response to the update, the reporting module 430 can compare the saved schedule customizations 435 and 440 and data model customization 445 and 450 to the updated authoring tool environment 401 to determine if changes to the environment 401 affect any of the saved custom configurations. If the comparison finds that elements of the saved custom configurations are affected by changes in the environment 401, the reporting module can provide, for example via user interface 455, an indication of those elements. In this way, the user need not reset, retest, etc each custom configuration. Rather, only those that are found to be affect can be checked and reset and/or retested as needed.

Stated another way, updating an authoring tool for providing one or more customized configurations for an application can comprise receiving a base package 405 including the application 417 and information defining a base configuration for the application. The application 417 and the base configuration, i.e., the schedule 415 and data model 420, for the application 417 can be installed. Instructions to modify the base configuration for the application 417 to create a custom configuration for the application 417 can be received via the user interface 455 and customization module 425 of the authoring tool environment 401. Information defining the custom configuration for the application, i.e., the schedule customizations 435 and 440 and data model customizations 445 and 450, can be saved separate from the application 417 and the information defining the base configuration, i.e., the schedule 415 and data model 420 of the base configuration.

As noted, the information defining the base configuration for the application can include the pre-defined schedule 415 and the pre-defined data model 420. The pre-defined schedule 415 can define tasks for installing and configuring the application 417. The data model 420 can include pre-defined configuration settings. In some cases, the data model 420 can further include information defining a questionnaire for configuring the application. The instructions to modify the base configuration for the application 417 can include instructions to modify the schedule 415 and/or instructions to modify the data model 420.

An update package 460 can be received. The update package 460 can include an update to the authoring tool and/or an update to the base configuration for the application 417. The update to the authoring tool can be installed and/or the update to the base configuration for the application 417 can be installed. The update to the base configuration for the application 417, if any, can comprise an update to the schedule 415 of the base configuration for the application 417 and/or an update to the data model 420 of the base configuration for the application 417. The information defining the custom configuration, i.e., the schedule customizations 435 and 440 and data model customizations 445 and 450, for the application 417 can be read, e.g., by the reporting module 430 of the authoring tool environment, and compared to the update to the authoring tool. A determination can be made as to whether the update to the authoring tool affects the custom configuration for the application based on comparing the information defining the custom configuration for the application to the update to the authoring tool. In response to determining the update to the authoring tool affects the custom configuration for the application, elements of the custom configuration for the application that are found to be affected can be reported, e.g., via the reporting module 430 and user interface 455 of the authoring tool environment.

Figure 5:
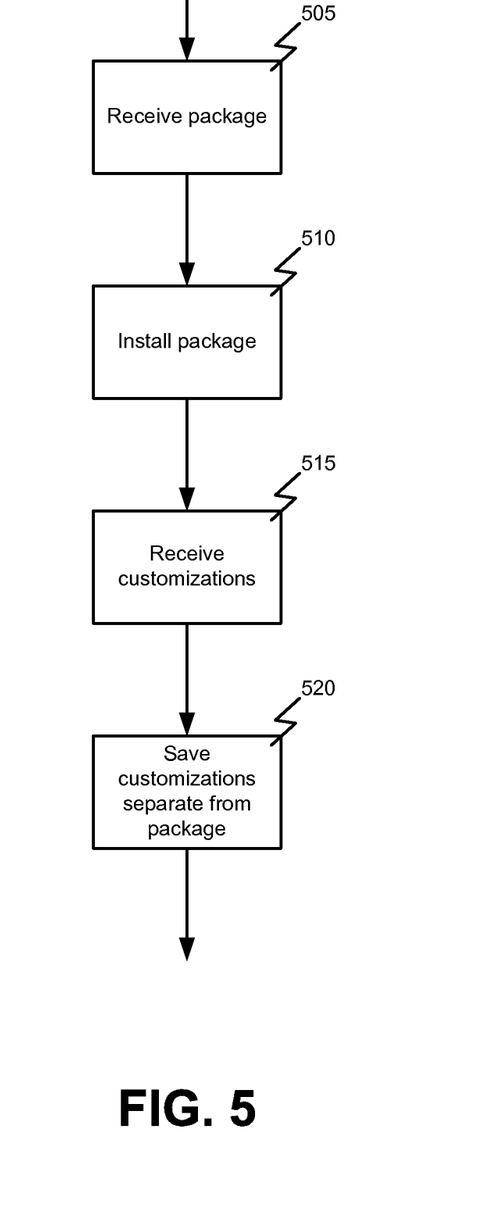
FIG. 5 is a flowchart illustrating a process for customizing a configuration of an application using an authoring tool according to one embodiment of the present invention.

FIG. 5 is a flowchart illustrating a process for customizing a configuration of an application using an authoring tool according to one embodiment of the present invention. In this example, the process can begin with receiving 505 a base package. As noted, the base package can include the application and information defining a base configuration for the application. The application and the base configuration for the application can be installed 510, for example in or on a system used for development and also executing an authoring tool as discussed above. Instructions to modify the base configuration for the application to create a custom configuration for the application can be received 515 via the authoring tool. Information defining the custom configuration for the application can be saved 520 separate from the application and the information defining the base configuration for the application.

Figure 6:
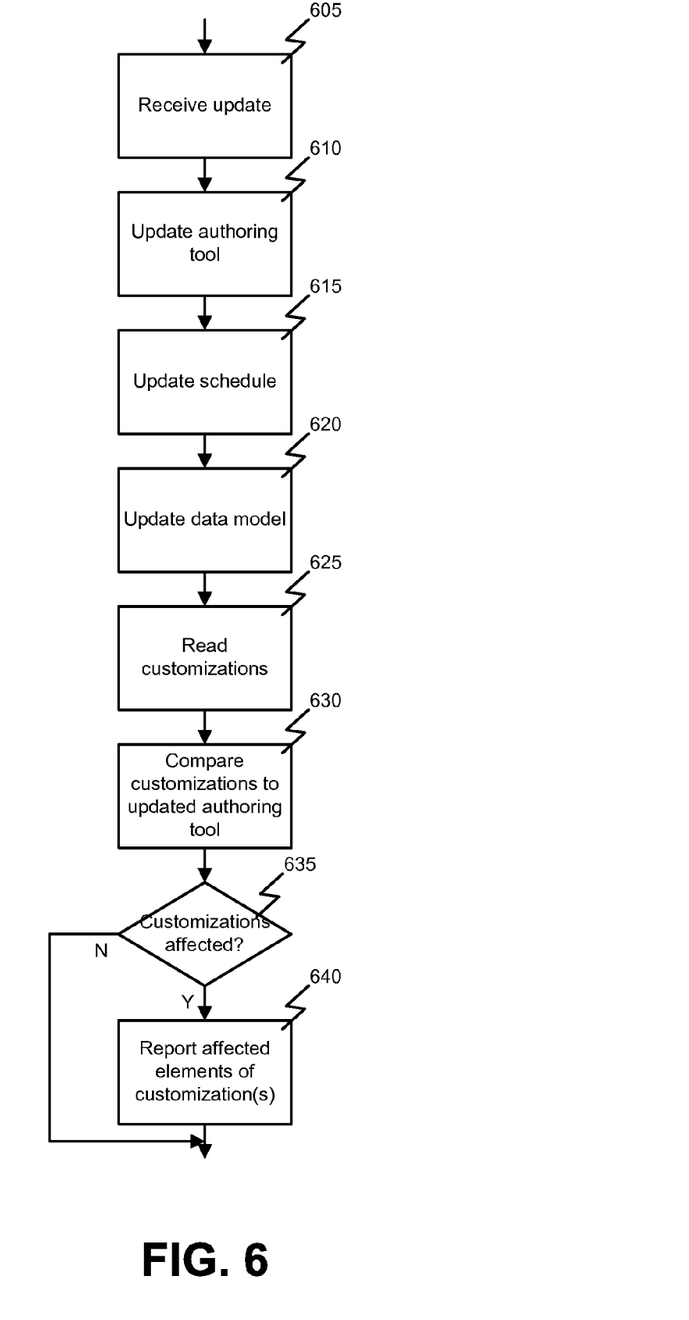
FIG. 6 is a flowchart illustrating a process for updating an authoring tool according to one embodiment of the present invention.

FIG. 6 is a flowchart illustrating a process for updating an authoring tool according to one embodiment of the present invention. In this example, the process begins with receiving 605 an update package. As noted above, the update package can include an update to the authoring tool and/or an update to the base configuration for the application. The update to the authoring tool can be installed 610 or the authoring tool can be updated based on the update package. If an update to the base configuration is included in the update package, the base configuration for the application can be installed or updated, i.e., the schedule can be updated 615 and/or the data model can be updated 620 if such update information is included in the update package.

The information defining the custom configuration for the application can be read 625 and compared 630 to the update to the authoring tool. A determination 635 can be made as to whether the update to the authoring tool affects the custom configuration for the application based on comparing 630 the information defining the custom configuration for the application to the update to the authoring tool. That is, the authoring tool can maintain a log or other indication or otherwise track extensions or changes to the base application and report as to whether these changes are affected by any updates. In response to determining 635 the update to the authoring tool affects the custom configuration for the application, elements of the custom configuration for the application that are found to be affected can be reported 640.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for updating an application authoring tool, the method comprising:
   receiving, by a computer system executing an installed, executable version of the application authoring tool, a base package including the application and information defining a base configuration for the application, wherein the application authoring tool comprises a tool separate from the application adapted to change the base configuration of the application and define one or more customized configuration to the application;
   installing, by the computer system, the application and the base configuration for the application, the base configuration for the application including a pre-defined data model for the application and a pre-defined schedule for the application, the pre-defined data model comprising definitions used by the application authoring tool to select custom configuration settings for the application and the pre-defined schedule comprising a definition of tasks used by the application authoring tool for installing and configuring the application;
   receiving, by the computer system via the application authoring tool, instructions to modify the base configuration for the application to create a custom configuration for the application;
   saving, by the computer system, information defining the custom configuration for the application separate from the application and the information defining the base configuration for the application, the information including customizations to the pre-defined data model for the application and the pre-defined schedule for the application;
   receiving, by the computer system, a first update package including an update to the application authoring tool, the update to the application authoring tool comprising a change to the installed, executable version of the application authoring tool; and
   installing, by the computer system, the update to the application authoring tool, wherein installing the update to the application authoring tool includes reading the information defining the custom configuration for the application, comparing the information defining the custom configuration for the application to the update to the application authoring tool, determining whether the update to the application authoring tool affects the custom configuration for the application based on comparing the information defining the custom configuration for the application saved by the computer system to the update to the application authoring tool wherein the update to the application authoring tool is determined to affect the custom configuration based on said comparing identifying changes to the customizations to the pre-defined data model or the customizations to the pre-defined schedule, and in response to determining the update to the application authoring tool affects the custom configuration for the application, reporting elements of the custom configuration for the application that are found to be affected by the update to the application authoring tool.

2. The method of claim 1, wherein the information defining the base configuration for the application includes the pre-defined schedule and the pre-defined data model and wherein the information defining the custom configuration for the application comprises one or more changes to a pre-defined schedule of the base configuration or one or more changes to a pre-defined data model of the base configuration made by the authoring tool to define the custom configuration.

3. The method of claim 2, wherein the pre-defined schedule defines tasks for installing and configuring the application and wherein the information defining the custom configuration for the application comprises one or more changes to the tasks for installing and configuring the application made by the authoring tool to define the custom configuration.

4. The method of claim 2, wherein the data model includes pre-defined configuration settings and wherein the information defining the custom configuration for the application comprises one or more changes to the configuration settings of the base configuration made by the authoring tool to define the custom configuration.

5. The method of claim 4, wherein the data model further includes information defining a questionnaire for configuring the application and wherein the information defining the custom configuration for the application comprises one or more changes to the questionnaire of the base configuration made by the authoring tool to define the custom configuration.

6. The method of claim 2, wherein the instructions to modify the base configuration for the application include instructions to modify the schedule.

7. The method of claim 2, wherein the instructions to modify the base configuration for the application include instructions to modify the data model.

8. The method of claim 2, further comprising:
   receiving, by the computer system, a second update package, the second update package including an update to the application authoring tool and an update to the base configuration for the application; and
   installing, by the computer system, the update to the application authoring tool and the update to the base configuration for the application.

9. The method of claim 8, wherein the update to the base configuration for the application comprises an update to the schedule of the base configuration for the application.

10. The method of claim 8, wherein the update to the base configuration for the application comprises an update to the data model of the base configuration for the application.

11. The method of claim 8, further comprising:
reading, by the computer system, the information defining the custom configuration for the application;
comparing, by the computer system, the information defining the custom configuration for the application to the update to the application authoring tool from the second update package; and
determining, by the computer system, whether the update to the application authoring tool from the second update package affects the custom configuration for the application based on comparing the information defining the custom configuration for the application to the update to the application authoring tool.

12. The method of claim 11, further comprising, in response to determining the update to the application authoring tool affects the custom configuration for the application, reporting, by the computer system, elements of the custom configuration for the application that are found to be affected.

13. A system comprising:
a processor; and
a memory communicatively coupled with and readable by the processor and comprising a set of instructions stored therein which, when executed by the processor, cause the processor to update an installed, executable version of an application authoring tool separate from the application and adapted to change the base configuration of the application and define one or more customized configurations for an application by receiving a base package including the application and information defining a base configuration for the application, installing the application and the base configuration for the application, the base configuration for the application including a pre-defined data model for the application and a pre-defined schedule for the application, the pre-defined data model comprising definitions used by the application authoring tool to select custom configuration settings for the application and the pre-defined schedule comprising a definition of tasks used by the application authoring tool for installing and configuring the application, receiving via the application authoring tool instructions to modify the base configuration for the application to create a custom configuration for the application, saving information defining the custom configuration for the application separate from the application and the information defining the base configuration for the application, the information including customizations to the pre-defined data model for the application and the pre-defined schedule for the application, receiving a first update package including an update to the application authoring tool, the update to the application authoring tool comprising a change to the installed, executable version of the application authoring tool, and installing the update to the application authoring tool, wherein installing the update to the application authoring tool includes reading the information defining the custom configuration for the application, comparing the information defining the custom configuration for the application to the update to the application authoring tool, determining whether the update to the application authoring tool affects the custom configuration for the application based on comparing the information defining the saved custom configuration for the application to the update to the application authoring tool wherein the update to the application authoring tool is determined to affect the custom configuration based on said comparing identifying changes to the customizations to the pre-defined data model or the customizations to the pre-defined schedule, and in response to determining the update to the application authoring tool affects the custom configuration for the application, reporting elements of the custom configuration for the application that are found to be affected by the update to the application authoring tool.

14. The system of claim 13, wherein the information defining the base configuration for the application includes the pre-defined schedule and the pre-defined data model.

15. The system of claim 14, wherein the instructions to modify the base configuration for the application include instructions to modify the schedule.

16. The system of claim 14, wherein the instructions to modify the base configuration for the application include instructions to modify the data model.

17. The system of claim 14, further comprising:
receiving a second update package, the second update package including an update to the application authoring tool and an update to the base configuration for the application; and
installing the update to the application authoring tool and the update to the base configuration for the application.

18. The system of claim 17, wherein the update to the base configuration for the application comprises an update to the schedule of the base configuration for the application.

19. The system of claim 17, wherein the update to the base configuration for the application comprises an update to the data model of the base configuration for the application.

20. The system of claim 17, further comprising:
reading the information defining the custom configuration for the application;
comparing the information defining the custom configuration for the application to the update to the application authoring tool from the second update package; and
determining whether the update to the application authoring tool from the second update package affects the custom configuration for the application based on comparing the information defining the custom configuration for the application to the update to the application authoring tool.

21. The system of claim 20, further comprising, in response to determining the update to the application authoring tool affects the custom configuration for the application, reporting elements of the custom configuration for the application that are found to be affected.

22. A memory device comprising a set of instructions stored thereon which, when executed by a processor, cause the processor to update an installed, executable version of an application authoring tool for an application by:
receiving a base package including the application and information defining a base configuration for the application, wherein the application authoring tool comprises a tool separate from the application adapted to change the base configuration of the application and define one or more customized configuration to the application based on the base configuration for the application;
installing the application and the base configuration for the application, the base configuration for the application including a pre-defined data model for the application and a pre-defined schedule for the application, the pre-defined data model comprising definitions used by the application authoring tool to select custom configuration settings for the application and the pre-defined schedule comprising a definition of tasks used by the application authoring tool for installing and configuring the application;

receiving via the application authoring tool instructions to modify the base configuration for the application to create a custom configuration for the application;

saving information defining the custom configuration for the application separate from the application and the information defining the base configuration for the application, the information including customizations to the pre-defined data model for the application and the pre-defined schedule for the application;

receiving a first update package including an update to the application authoring tool, the update to the application authoring tool comprising a change to the installed, executable version of the application authoring tool; and installing the update to the application authoring tool, wherein installing the update to the application authoring tool includes reading the information defining the custom configuration for the application, comparing the information defining the custom configuration for the application to the update to the application authoring tool, determining whether the update to the application authoring tool affects the custom configuration for the application based on comparing the saved information defining the custom configuration for the application to the update to the application authoring tool wherein the update to the application authoring tool is determined to affect the custom configuration based on said comparing identifying changes to the customizations to the pre-defined data model or the customizations to the pre-defined schedule, and in response to determining the update to the application authoring tool affects the custom configuration for the application, reporting elements of the custom configuration for the application that are found to be affected by the update to the application authoring tool.

23. The memory device of claim 22, wherein the information defining the base configuration for the application includes a pre-defined schedule and a pre-defined data model.

* * * * *

UNITED STATES PATENT AND TRADEMARK OFFICE
CERTIFICATE OF CORRECTION

Page 1 of 1

PATENT NO.        : 8,726,272 B2
APPLICATION NO.   : 12/354057
DATED             : May 13, 2014
INVENTOR(S)       : Williams et al.

It is certified that error appears in the above-identified patent and that said Letters Patent is hereby corrected as shown below:

In the Specification

In column 1, line 10, delete "Stem" and insert -- Stern --, therefor.

Signed and Sealed this
Seventh Day of October, 2014

Michelle K. Lee
*Deputy Director of the United States Patent and Trademark Office*

UNITED STATES PATENT AND TRADEMARK OFFICE
Certificate

Patent No. 8,726,272 B2                                      Patented: May 13, 2014

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Thomas R. Williams, Lone Tree, CO (US); Shawn A. Martine, Denver, CO (US); Timothy Threlkeld, Denver, CO (US); Jason K. Reicheneker, Highlands Ranch, CO (US); Daniel Scott Stern, Denver, CO (US); Manuel Albert Neyra, Highlands Ranch, CO (US); and Fred Allen Brown, Highlands Ranch, CO (US).

Signed and Sealed this Fourth Day of November 2014.

DON WONG
*Supervisory Patent Examiner*
Art Unit 2198
Technology Center 2100